June 16, 1953 H. L. EISENBART 2,641,926
DRAWBAR PULL GAUGE DEVICE
Filed Jan. 23, 1950 2 Sheets-Sheet 1

INVENTOR.
HENRY L. EISENBART
BY M. Y. Charles
ATTORNEY.

June 16, 1953  H. L. EISENBART  2,641,926
DRAWBAR PULL GAUGE DEVICE
Filed Jan. 23, 1950  2 Sheets-Sheet 2
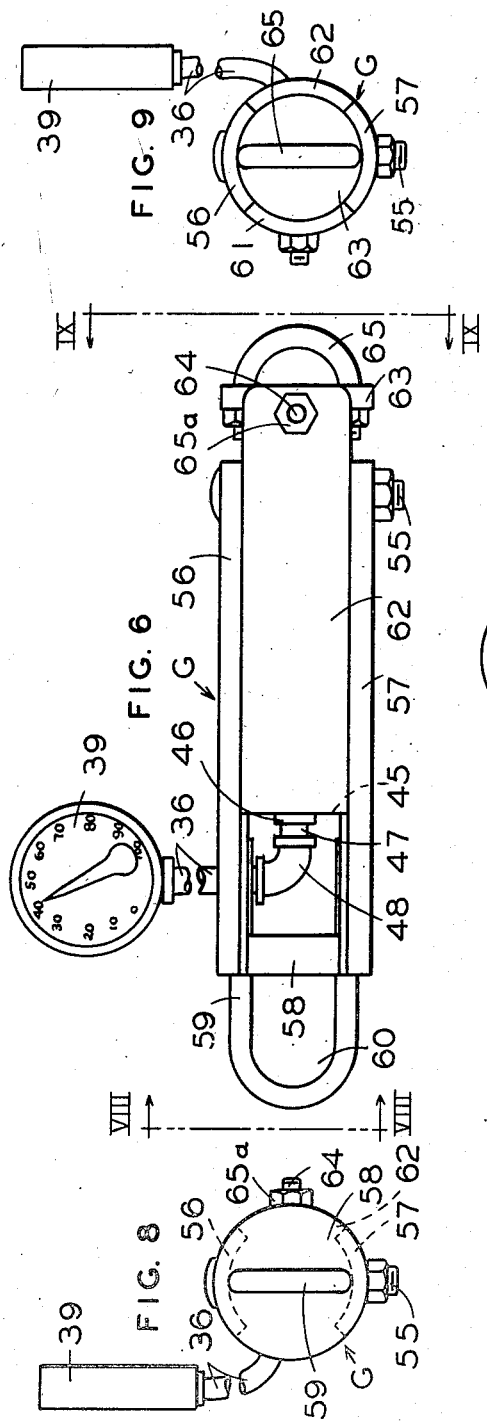
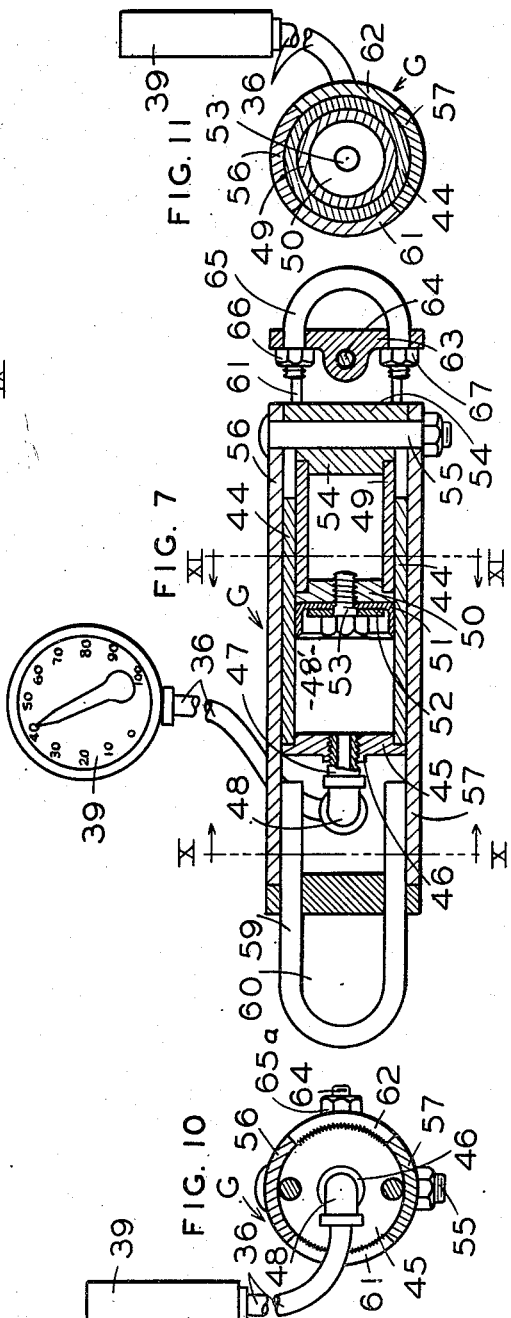
INVENTOR.
HENRY L. EISENBART
BY
M. Y. Charles
ATTORNEY.

Patented June 16, 1953

2,641,926

UNITED STATES PATENT OFFICE 2,641,926

DRAWBAR PULL GAUGE DEVICE

Henry L. Eisenbart, Fowler, Kans.

Application January 23, 1950, Serial No. 140,111

1 Claim. (Cl. 73—141)

My invention relates to a device for indicating the pounds pull being exerted by a tractor to pull a load such as a farm implement that is attached thereto.

An object of the invention is to provide a pounds pull measuring device of the kind mentioned that is simple, compact, easy to make, one that is inexpensive, one that can be inserted in the hitch line between any tractor and the load the tractor is to pull, and one that is highly efficient and accurate in its work. These and other objects of the invention will be more fully described as this description progresses.

Now referring to the accompanying drawings in which similar numerals of reference designate the same parts throughout the several figures of the drawings:

Fig. 6 is a detail side view of a modified form of the pounds pull gauge device.

Fig. 7 is a detail longitudinal sectional view of the device shown in Fig. 6.

Fig. 8 is an end view of the device as shown in Fig. 6, the view being as seen from the line VIII—VIII in Fig. 6 and looking in the direction of the arrows.

Fig. 9 is an end view of the device as shown in Fig. 6, the view being as seen from the line IX—IX in Fig. 6, and looking in the direction of the arrows.

Fig. 10 is a detail cross sectional view through the device the view being as seen from the line X—X in Fig. 7 and looking in the direction of the arrows.

Fig. 11 is a detail cross sectional view of the device, the view being as seen from the line XI—XI in Fig. 7, and looking in the direction of the arrows.

Figure 1:
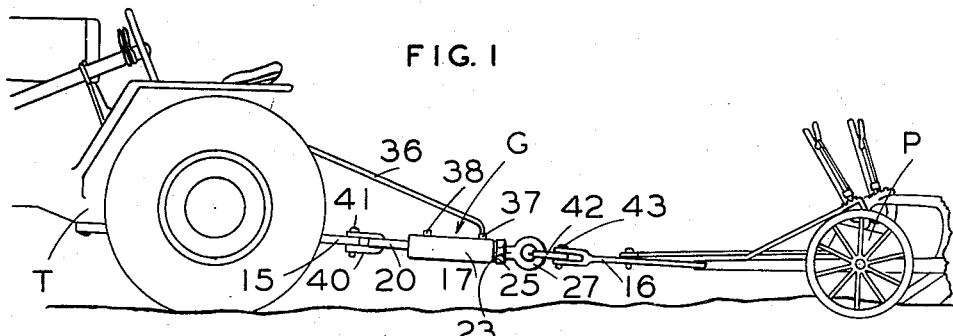
Fig. 1 is a side view of the rear portion of a tractor, the front portion of a farm implement to be pulled by the tractor, and showing my pounds pull gauge inserted in the hitch line between the tractor and the farm implement.

In the drawings is shown the rear portion of a tractor T having the usual draw bar or hitch element 15, and at P is shown a farm implement which, in this case is a one way plow. The plow device P has a tongue portion 16, and the pounds pull gauge device G is interposed between and is attached to the draw bar 15 and the tongue element 16 in a manner that will later be described.

Figure 2:
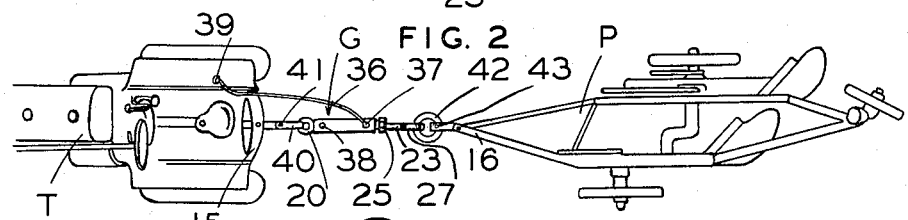
Fig. 2 is a top plan view of the elements shown in Fig. 1, the scale of the figure being reduced to show more of each element.
Figure 3:
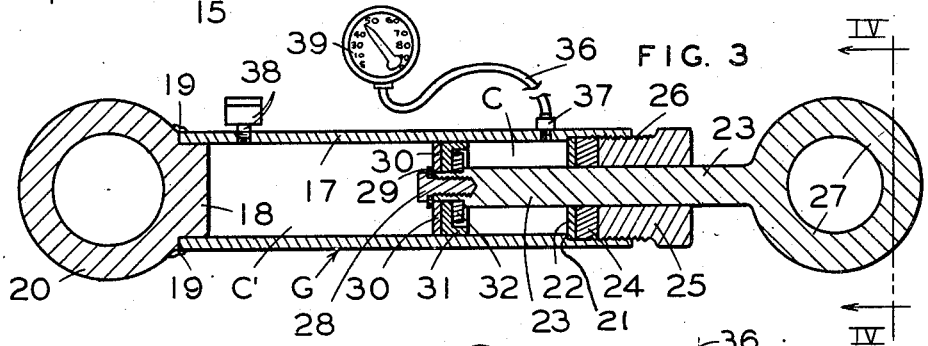
Fig. 3 is an enlarged detail longitudinal sectional view through the pounds pull gauge device.
Figures 4, 5:
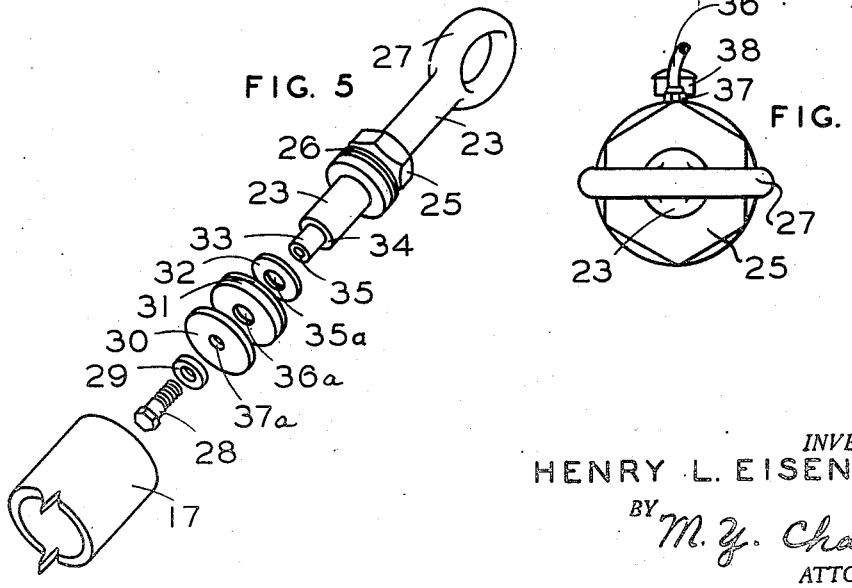
Fig. 4 is an end view of the device shown in Fig. 3, the view being as seen from the line IV—IV in Fig. 3 and looking in the direction of the arrows.
Fig. 5 is an exploded perspective view of the several working parts of the device and showing the parts in the order of assembly.

The device, as shown in Figures 1 to 5 inclusive, consists of a tubular element 17 having a closure or head element 18 fitted in one end thereof and made rigid therewith, either by threads or welding 19. The head 18 is provided with an eye element 20 that is preferably integrally formed thereon.

The other end of the tube 17 is provided with an internal and outwardly extending annular shoulder 21 against which a washer 22 rests. A draw shaft 23 is slidably passed through the washer 22 and a packing material 24 is packed around the draw shaft 23 and within the outer end of the tubular element 17. The device is provided with a packing nut and sleeve 25, a portion of which is threaded as at 26. The end of the sleeve 25 is slidably inserted into the end of the tubular element 17 and the threads 26 are threaded into the end of the tubular element to forcibly engage the end of the sleeve 25 against the packing material 24 to form a liquidtight joint around the draw shaft 23 which also slidably passes through the packing sleeve and nut 25. The outer end of the draw shaft 23 has an eye formation 27 that is integrally formed thereon for hitching purposes as will later be described.

Fitted within the tubular element 17 is a piston assembly consisting of a cap screw 28, a washer 29, a piston leather supporting washer 30, a piston cup leather 31 that fits closely against the inner wall surface of the tubular element 17, and a second piston leather supporting washer 32. The inner end of the draw shaft 23 has a diametrically reduced shaft portion 33 which leaves a shoulder 34 thereon. The washer 32, piston cup leather 31 and washer 30 have holes 35a, 36a and 37a therethrough that are large enough to slidably receive and pass the draw shaft portion 33. The washer 29 is larger in diameter than the hole 37 in the washer 30. The washer 32, piston cup leather 31, and washer 30 are slipped onto the reduced shaft end 33 in the order above recited and so that the washer 32 rests against the shaft shoulder 34 whereupon the cap screw 28 is slidably passed through the washer 29 and is then threaded into a threaded hole 35 in the shaft portion 33 so that the washer 29 will bear against the washer 30 to rigidly bind and hold the piston assembly together in the assembled order above described to form the hydraulic chamber C.

The device is provided with a flexible hose line 36, one end of which is connected to fitting 37 that is threaded through the wall of the tubular element 17 and opens into the hydraulic chamber C. On the other end of the flexible hose is attached a hydraulic pressure gauge 39. In the other end of the tubular element 17 is formed an air chamber C' and a breather element 38 is carried on the tubular element 17 and opens into the air chamber C' to permit the passage of air in and out of the air chamber C' as the piston is moved forward or rearward in the tubular element 17. The hydraulic chamber C and hose line 36 may be filled with oil or any other suitable liquid for operating the pressure gauge 39.

To install the device for use a clevis 40 is hooked through the eye element 20 and then a pin 41 is passed through the ends of the clevis 40 and the draw-bar or hitch element 15 of the tractor T. Similarly a ring 42 is passed through the eye element 27 of the draw shaft 23 and a pin 43 is passed through the ring 42 and the tongue portion 16 of the plow P. This having been done the device is now ready for use. As the tractor T moves forward the load of the plow P will pull the draw shaft 23 and piston assembly in the tubular element 17 rearwardly whereupon the hydraulic liquid in the chamber C will be placed under pressure and will operate the pressure gauge 39 to indicate the number of pounds pull being exerted by the tractor T to pull the plow P.

In Figures 6 to 11 inclusive is shown a modified form of the invention and probably the preferred form of the invention. In these figures the device is shown as having a tubular cylinder element 44 having a head element 45 rigidly fixed, preferably welded, thereto. The head element 45 has a centrally positioned boss 46 through which a nipple 47 is threaded and opens into the hydraulic compression chamber 48' that is formed in the tubular cylinder element 44 that will later be described. The nipple 47 is connected to one end of an L pipe fitting 48 and to the other end of the L pipe fitting 48 is attached one end of a flexible hose element 36 the other end of which is connected to a hydraulic pressure gauge 39 the same as hereinbefore described.

Slidably positioned within the tubular cylinder element 44 is a tubular piston element 49, one end of which projects from and well beyond the adjacent end of the tubular cylinder element 44. The inner end of the tubular piston element 49 is provided with a closure element 50 that is rigidly attached, preferably welded, thereto. A piston cup leather 51 is tightly and slidably fitted within the tubular cylinder element 44 and is positioned against the closure element 50 of the tubular piston element 49. A washer 52 is positioned within the cup of the piston cup leather 51 and a cap screw 53 is slidably passed through the washer 52 and piston cup leather 51 and is threaded into the closure element 50 of the tubular piston element 49 to rigidly hold the foregoing described assembly together.

The outer end of the tubular piston element 49 is provided with a closure element 54 that is rigidly attached, preferably welded thereto. The outer closure element 54 has a bolt 55 slidably and diametrically passed therethrough.

The device is provided with a pair of leg elements 56 and 57 the cross sections of which are arcuate and are slidably positioned against opposite sides of the tubular cylinder element 44 and each leg 56 and 57 extend substantially one quarter of the way around the tubular cylinder element 44 against which they slidably rest. The rear ends of the legs 56 and 57 extend along opposite sides of the piston closure element 54 and the bolt 55 also slidably passes through the rear ends of the legs 56 and 57 to join the legs 56 and 57 to the closure element 54. The device is further provided with a draw plate 58 that is spaced away from the cylinder head element 45 and the forward ends of the legs 56 and 47 are rigidly attached, preferably welded, thereto.

The device is further provided with a U-shaped hitch element 59 the legs of which are slidably passed through holes in the draw plate 58 and are positioned one against the inside surface of each of the legs 56 and 57 and are welded to the draw plate 58 and their respective leg element 56 and 57 to form an eye 60 for hitch purposes as will later be explained.

The device is further provided with a second pair of leg elements 61 and 62, the cross sections of which are arcuate. The second pair of leg elements 61 and 62 are fitted one against opposite sides of the tubular cylinder element 44 and are welded thereto, and are between the first pair of legs 56 and 57 that are slidable therebetween, the edges of the legs 61 and 62 forming guides for the sliding movements of the first pair of leg elements 56 and 57 therebetween. The rear end portions of the second pair of leg elements 61 and 62 extend beyond the rear end of the tubular cylinder element 44 and past and beyond the piston closure element 54 and straddle a second draw plate 63 that is spaced away from the closure element 54 and a bolt 64 is slidably passed through the rear ends of the second pair of legs 61 and 62 and diametrically through the second draw plate 63 to rigidly attach and hold the ends of the legs 61 and 62 and the draw plate 63 together. A nut 65a is threaded on the end of the bolt 64 to retain the bolt 64 in its position relative to the parts 61, 62 and 63.

The legs of a U-bolt 65 are slidably passed through holes in the second draw plate 63 that are diametrically positioned across from each other and are positioned one on either side of the bolt 64. Nuts 66 and 67 are threaded one on each of the legs of the U-bolt 65 to retain the U-bolt 65 on the second draw plate 63, or if desired, the legs of the U-bolt 65 may be welded to the draw plate 63 to rigidly attach the U-bolt 65 to the draw plate 63.

If it is desired to disassemble the device for any reason such as replacing the piston cup leather 51, the two bolts 55 and 64 may be removed whereupon the draw plate 63 may be removed and then the tubular piston element 49 and its assembly 53, 52, 51, 50, 49 and 54 may be slipped rearwardly and removed from the tubular cylinder element 44. The device may be reassembled in the order of the above described disassembly.

While the device as shown and described are probably the best forms and construction of the device, it is to be understood that such modifications of the device and its details of structure and assembly may be employed as lie within the scope of the appended claims without departing from the spirit and intention of the invention. Now having fully shown and described my invention, what I claim is:

In a draw bar pull gauge of the kind described; a cylinder and a piston element slidably mounted therein to form a hydraulic pressure chamber within the cylinder and between the head thereof and the piston, said piston comprising a tube having one end closed and carrying a piston sealing element for forming a liquid tight joint between the cylinder and piston, one end of the tubular piston element projecting from the cylinder element, a pair of leg elements, said leg elements being slidably positioned one along each opposite sides of the cylinder and each leg being transversely curved and extending one quarter way around the cylinder, and means connectedly associating one end of each leg with the projecting end of the tubular piston element, a draw plate, said draw plate being spaced away from the head of the cylinder and having the other end of each of said legs attached thereto, and means carried by said draw plate for attachment to the draw bar of a tractor, a second pair of leg elements, said second pair of leg elements being transversely curved and fitted against opposite sides of the cylinder element and one between each of the first said pair of leg elements and being rigidly attached to the cylinder element to form guides against which the first said legs may longitudinally slide, a second draw plate, said second draw plate being spaced beyond the projecting end of the tubular piston element and one end of each of the second said pair of legs being connected to the second said plate, and means carried by the second said draw plate for attachment to a load to be pulled by the tractor, a flexible hose element and a hydraulic pressure gauge, one end of the flexible hose element being connected with the said cylinder and opening into the said hydraulic chamber formed within the cylinder, the other end of the flexible hose being connected with the hydraulic pressure gauge and opening thereinto to admit hydraulic pressure thereinto that is developed in the hydraulic pressure chamber by the pull of the tractor against the load to be pulled by the tractor.

HENRY L. EISENBART.

References Cited in the file of this patent

UNITED STATES PATENTS

| Number | Name | Date |
|---|---|---|
| 1,091,599 | Stephens | Mar. 31, 1914 |
| 1,303,786 | Fouch | May 13, 1919 |
| 1,424,888 | Eason | Aug. 8, 1922 |
| 1,677,538 | Whaley | July 17, 1928 |
| 1,934,201 | Miller | Nov. 7, 1933 |